United States Patent
Park

(10) Patent No.: US 7,179,192 B2
(45) Date of Patent: Feb. 20, 2007

(54) SIX-SPEED POWERTRAIN OF AN AUTOMATIC TRANSMISSION

(75) Inventor: Jong Sool Park, Suwon (KR)

(73) Assignee: Hyundai Motor Company, Seoul (KR)

( * ) Notice: Subject to any disclaimer, the term of this patent is extended or adjusted under 35 U.S.C. 154(b) by 174 days.

(21) Appl. No.: 11/028,269

(22) Filed: Dec. 30, 2004

(65) Prior Publication Data

US 2006/0052212 A1    Mar. 9, 2006

(30) Foreign Application Priority Data

Sep. 7, 2004    (KR) .................... 10-2004-0071078

(51) Int. Cl.
F16H 3/62    (2006.01)
(52) U.S. Cl. ..................... 475/277; 475/280
(58) Field of Classification Search ......... 475/275–283
See application file for complete search history.

(56) References Cited

U.S. PATENT DOCUMENTS

| | | | | |
|---|---|---|---|---|
| 3,067,632 A | * | 12/1962 | Foerster et al. | 475/59 |
| 3,835,732 A | * | 9/1974 | Mori et al. | 475/276 |
| 3,971,268 A | * | 7/1976 | Murakami et al. | 475/276 |
| 4,070,927 A | * | 1/1978 | Polak | 475/286 |
| 4,478,106 A | * | 10/1984 | Schreiner | 475/276 |
| 5,133,697 A | | 7/1992 | Hattori | |
| 2004/0048716 A1 | * | 3/2004 | Ziemer | 475/286 |

FOREIGN PATENT DOCUMENTS

| | | |
|---|---|---|
| EP | 1 391 635 A1 | 2/2004 |
| JP | 2004176764 | 6/2004 |
| JP | 2005-155719 | * 6/2005 |

* cited by examiner

*Primary Examiner*—Ha Ho
(74) *Attorney, Agent, or Firm*—Morgan Lewis & Bockius LLP

(57) ABSTRACT

Durability and power transmission efficiency are enhanced in a six-speed powertrain of an automatic transmission by a scheme that includes first to forth planetary gearsets. The first planetary gearset includes a first sun gear, first ring gear, and first carrier. The second planetary gearset includes a second sun gear, a second ring gear, and a second carrier. The third planetary gearset includes operational elements of a third sun gear, a third ring gear, and a third carrier. The fourth planetary gearset includes a fourth sun gear, a fourth ring gear, and a fourth carrier. The powertrain also includes an input shaft, an output gear, and a transmission case.

12 Claims, 16 Drawing Sheets

FIG.5

| Speed | C1 | C2 | C3 | B1 | B2 | Shift ratio | Step ratio |
|-------|----|----|----|----|----|-------------|------------|
| D1 |  |  | O | O |  | 5.101 | 1.70 |
| D2 |  |  | O |  | O | 3.000 | 1.60 |
| D3 | O |  | O |  |  | 1.875 | 1.36  D1/D6 = 6.56 |
| D4 |  | O | O |  |  | 1.378 | 1.38 |
| D5 | O | O |  |  |  | 1.000 | 1.29 |
| D6 |  | O |  |  | O | 0.778 |  |
| R | O |  |  | O |  | −3.500 | R/D1 = −0.69 |

| | | |
|---|---|---|
| $Z_{R1}/Z_{S1}=$ | 3.500 | SPPG |
| $Z_{R2}/Z_{S2}=$ | 2.332 | SPPG |
| $Z_{R3}/Z_{S3}=$ | 2.000 | SPPG |
| $Z_{R4}/Z_{S4}=$ | 3.500 | SPPG |

FIG.14B

| Speed | Shift ratio |
|---|---|
| D1 | 5.101 |
| D2 | 3.000 |
| D3 | 1.875 |
| D4 | 1.378 |
| D5 | 1.000 |
| D6 | 0.778 |
| R1 | −3.500 |

FIG. 14C

Rotation speed of each element (relative to input element)

| Speed | S1 | PC1 | R1 | S2 | PC2 | R2 | S3 | PC3 | R3 | IN | OUT | P1-PC1 | P2-PC2 | P3-PC3 |
|---|---|---|---|---|---|---|---|---|---|---|---|---|---|---|
| D1 | -0.686 | 0.000 | 0.196 | -0.686 | -0.206 | 0.000 | 1.000 | 0.196 | -0.206 | 1.000 | 0.196 | 0.549 | 0.720 | -1.606 |
| D2 | 0.000 | 0.259 | 0.333 | 0.000 | 0.000 | 0.000 | 1.000 | 0.333 | 0.000 | 1.000 | 0.333 | 0.207 | 0.000 | -1.332 |
| D3 | 1.000 | 0.637 | 0.533 | 1.000 | 0.300 | 0.000 | 1.000 | 0.533 | 0.300 | 1.000 | 0.533 | -0.291 | -1.050 | -0.933 |
| D4 | 1.961 | 1.000 | 0.725 | 1.961 | 0.588 | 0.000 | 1.000 | 0.725 | 0.588 | 1.000 | 0.725 | -0.769 | -2.059 | -0.549 |
| D5 | 1.000 | 1.000 | 1.000 | 1.000 | 0.300 | 0.000 | 1.000 | 1.000 | 1.000 | 1.000 | 1.000 | 0.000 | -1.050 | 0.000 |
| D6 | 0.000 | 1.000 | 1.286 | 0.000 | 0.000 | 0.000 | 1.000 | 1.286 | 1.429 | 1.000 | 1.286 | 0.800 | 0.000 | 0.571 |
| R1 | 1.000 | 0.000 | -0.286 | 1.000 | 0.300 | 0.000 | 1.000 | -0.286 | -0.928 | 1.000 | -0.286 | -0.800 | -1.050 | -2.569 |

*FIG. 14D*

Slip speeds of non-operated friction elements (relative to input element)

| Speed | C1 | C2 | C3 | B1 | B2 | SUM |
|---|---|---|---|---|---|---|
| D1 | 1.686 | 1.000 | 0.000 | 0.000 | 0.206 | 2.892 |
| D2 | 1.000 | 0.741 | 0.000 | 0.259 | 0.000 | 2.000 |
| D3 | 0.000 | 0.363 | 0.000 | 0.637 | 0.300 | 1.300 |
| D4 | 0.961 | 0.000 | 0.000 | 1.000 | 0.588 | 2.549 |
| D5 | 0.000 | 0.000 | 0.700 | 1.000 | 0.300 | 2.000 |
| D6 | 1.000 | 0.000 | 1.429 | 1.000 | 0.000 | 3.429 |
| R1 | 0.000 | 1.000 | 1.228 | 0.000 | 0.300 | 2.528 |
| SM | 4.646 | 3.104 | 3.357 | 3.896 | 1.694 | 16.698 |

FIG. 14E

Torque load (relative to input element)

| Speed | S1 | PC1 | R1 | S2 | PC2 | R2 | S3 | PC3 | R3 | TIN | TOUT | C1 | C2 | C3 | B1 | B2 |
|---|---|---|---|---|---|---|---|---|---|---|---|---|---|---|---|---|
| D1 | -0.600 | 2.701 | -2.101 | 0.600 | -2.001 | 1.401 | 1.000 | -3.001 | 2.001 | 1.000 | -5.102 | 0.000 | 0.000 | 2.001 | 2.701 | 0.000 |
| D2 | 0.000 | 0.000 | 0.000 | 0.000 | 0.000 | 0.000 | 1.000 | -3.001 | 2.001 | 1.000 | -3.001 | 0.000 | 0.000 | 2.001 | 0.000 | 2.001 |
| D3 | 0.000 | 0.000 | 0.000 | 0.375 | -1.250 | 0.875 | 0.625 | -1.875 | 1.250 | 1.000 | -1.875 | 0.375 | 0.000 | 1.250 | 0.000 | 0.000 |
| D4 | -0.162 | 0.730 | -0.568 | 0.162 | -0.541 | 0.378 | 0.270 | -0.811 | 0.541 | 1.000 | -1.378 | 0.000 | 0.730 | 0.541 | 0.000 | 0.000 |
| D5 | -0.286 | 1.286 | -1.000 | 0.000 | 0.000 | 0.000 | 0.000 | 0.000 | 0.000 | 1.000 | -1.000 | -0.286 | 1.286 | 0.000 | 0.000 | 0.000 |
| D6 | -0.222 | 1.000 | -0.778 | 0.222 | 0.741 | 0.519 | 0.000 | 0.000 | 0.000 | 1.000 | -0.778 | 0.000 | 1.000 | 0.000 | 0.000 | -0.741 |
| R1 | 1.000 | -4.499 | 3.499 | 0.000 | 0.000 | 0.000 | 0.000 | 0.000 | 0.000 | 1.000 | 3.499 | 1.000 | 0.000 | 0.000 | -4.499 | 0.000 |

FIG.14F

Power transmission route

| Speed | Number of planetary gearset | Power transmission |
|---|---|---|
| D1 | 3 | PG-PG2-PG3 |
| D2 | 1 | PG3 |
| D3 | 2 | PG2-PG3 |
| D4 | 3 | PG1-PG2-PG3 |
| D5 | 0 | |
| D6 | 1 | PG1 |
| R1 | 1 | PG1 |

SIX-SPEED POWERTRAIN OF AN AUTOMATIC TRANSMISSION

CROSS-REFERENCE TO RELATED APPLICATION

This application claims priority to and the benefit of Korean Patent Application No. 10-2004-0071078 filed in the Korean Intellectual Property Office on Sep. 7, 2004, the entire content of which is incorporated herein by reference.

FIELD

Generally, the present invention relates to an automatic transmission. More particularly, the present invention relates to a powertrain of an automatic transmission that realizes multiple shift speeds with a combination of a plurality of planetary gearsets.

BACKGROUND

A typical shift mechanism of an automatic transmission utilizes a combination of a plurality of planetary gearsets. A powertrain of such an automatic transmission that includes the plurality of planetary gearsets changes rotation speed and torque received from a torque converter of the automatic transmission, and accordingly changes and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is constantly under investigation.

In addition, with the same number of speeds, the features of a powertrain, such as durability, efficiency in power transmission, and size depend a lot on the layout of the combined planetary gearsets. Therefore, designs for combined structure of a powertrain are also constantly under investigation.

Furthermore, a manual transmission that has too many speeds is inconvenient to use as it requires a driver to shift frequently. Therefore, the positive features of having more shift-speeds are more relevant and appropriate for automatic transmissions, because automatic transmissions automatically control shifting operations without needing manual operation.

In addition to various developments regarding four and five speed powertrains, powertrains of automatic transmissions realizing six forward speeds and one reverse speed have recently been introduced.

These six-speed powertrains may include multiple friction elements, clutches and brakes. However, the more friction elements used the heavier and larger the automatic transmission.

Such automatic transmissions also have durability problems when their elements always rotate at high speeds.

Therefore, an automatic transmission that addresses the above drawbacks while improving efficiency of power transmission would be highly desirable.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

Embodiments of the present invention provide a six-speed powertrain having stability and durability by having a small number of frictional elements.

An exemplary six-speed powertrain of an automatic transmission according to an embodiment of the present invention includes: a first planetary gearset having operational elements of a first sun gear, a first ring gear, and a first carrier; a second planetary gearset having operational elements of a second sun gear, a second ring gear, and a second carrier; a third planetary gearset having operational elements of a third sun gear, a third ring gear, and a third carrier; a fourth planetary gearset having operational elements of a fourth sun gear, a fourth ring gear, and a fourth carrier; an input shaft; an output gear; and a transmission case.

The first ring gear is fixedly connected to the third carrier and the fourth ring gear. The first carrier is fixedly connected to the fourth carrier. The first sun gear is fixedly connected to the second sun gear. The second ring gear is always stationary by being fixedly connected to the transmission case. The third sun gear always acts as an input element by being fixedly connected to the input shaft. The third carrier always acts as an output element by being fixedly connected to the output gear. The fourth sun gear is variably connected to the input shaft via a first clutch. At least one of the fixedly connected first and fourth carriers is variably connected to the input shaft via a second clutch. The second carrier is variably connected to the third ring gear via a third clutch. At least one of the fixedly connected first and fourth carriers is variably connected to the transmission case via a first brake and is subject to a stopping operation of the first brake. The second carrier is variably connected to the transmission case via a second brake and is subject to a stopping operation of the second brake.

In a further embodiment, the first, second, third, and fourth planetary gearsets are disposed in a sequence of the second planetary gearset, the first planetary gearset, the fourth planetary gearset, and the third planetary gearset.

In a still further embodiment, the first operational element of the first planetary gearset is integrally formed with the tenth operational element of the fourth planetary gearset, and the second operational element of the first planetary gearset is integrally formed with the eleventh operational element of the fourth planetary gearset, such that the first and fourth planetary gearsets form a compound planetary gearset.

Regarding such an exemplary six-speed powertrain of an automatic transmission, arrangement of the input shaft, the output gear, and the first to third clutches may be variously changed.

As a first example, the input shaft is disposed in a same direction of the output gear with respect to the third planetary gearset, one of the first and second clutches is disposed toward the input shaft with respect to the third planetary gearset, and another one of the first and second clutches is disposed opposite of the input shaft with respect to the second planetary gearset.

In this case, the first clutch may be disposed toward the input shaft with respect to the third planetary gearset, and the second clutch may be disposed opposite of the input shaft with respect to the second planetary gearset.

As a second example, the input shaft is disposed in a same direction of the output gear with respect to the third planetary gearset, and both of the first and second clutches are disposed toward the input shaft with respect to the third planetary gearset.

In this case, the first and second clutches may be disposed in a sequence of the first clutch and the second clutch, in a direction from the third planetary gearset to the input shaft.

Alternatively in this case, the first and second clutches may be disposed in a sequence of the second clutch and the first clutch, in a direction from the third planetary gearset to the input shaft.

As a third example, the input shaft is disposed opposite of the output gear with respect to the second planetary gearset, and both of the first and second clutches are disposed toward the input shaft with respect to the second planetary gearset.

In this case, the first and second clutches may be disposed in a sequence of the first clutch and the second clutch, in a direction from the second planetary gearset to the input shaft.

A one way clutch disposed in parallel with the first brake may be further included in such an exemplary six-speed powertrain of an automatic transmission. The first and second brakes may be realized as wet-type multi-plate brakes or band brakes.

In a wider scope, another exemplary six-speed powertrain of an automatic transmission according to the present invention includes: a first planetary gearset having first, second, and third operational elements that occupy sequential positions in a lever diagram; a second planetary gearset having fourth, fifth, and sixth operational elements that occupy sequential positions in a lever diagram; a third planetary gearset having seventh, eighth, and ninth operational elements that occupies sequential positions in a lever diagram; a fourth planetary gearset having tenth, eleventh, and twelfth operational elements that occupy sequential positions in a lever diagram; an input shaft; an output shaft; and a transmission case.

The first operational element is fixedly connected to the eighth operational element and the tenth operational element. The second operational element is fixedly connected to the eleventh operational element. The third operational element is fixedly connected to the sixth operational element. The fourth operational element is always stationary by being fixedly connected to the transmission case. The seventh operational element always acts as an input element by being fixedly connected to the input shaft. The eighth operational element always acts as an output element by being fixedly connected to the output gear. The twelfth operational element is variably connected to the input shaft via a first clutch. At least one of the fixedly connected second and eleventh operational elements is variably connected to the input shaft via a second clutch. The fifth operational element is variably connected to the ninth operational element via a third clutch. At least one of the fixedly connected second and eleventh operational elements is variably connected to the transmission case via a first brake and is subject to a stopping operation of the first brake. The fifth operational element is variably connected to the transmission case via a second brake and is subject to a stopping operation of the second brake.

In a further embodiment, the first, second, third, and fourth planetary gearsets are disposed in a sequence of the second planetary gearset, the first planetary gearset, the fourth planetary gearset, and the third planetary gearset.

In a still further embodiment, the first operational element of the first planetary gearset is integrally formed with the tenth operational element of the fourth planetary gearset, and the second operational element of the first planetary gearset is integrally formed with the eleventh operational element of the fourth planetary gearset, such that the first and fourth planetary gearsets form a compound planetary gearset.

Regarding such an exemplary six-speed powertrain of an automatic transmission, arrangement of the input shaft, the output gear, and the first to third clutches may be variously changed.

As a first example, the input shaft is disposed in a same direction of the output gear with respect to the third planetary gearset, one of the first and second clutches is disposed toward the input shaft with respect to the third planetary gearset, and another of the first and second clutches is disposed opposite of the input shaft with respect to the second planetary gearset.

In this case, the first clutch may be disposed toward the input shaft with respect to the third planetary gearset, and the second clutch may be disposed opposite of the input shaft with respect to the second planetary gearset.

As a second example, the input shaft is disposed in a same direction of the output gear with respect to the third planetary gearset, and both of the first and second clutches are disposed toward the input shaft with respect to the third planetary gearset. In this case, the first and second clutches may be disposed in a sequence of the first clutch and the second clutch, in a direction from the third planetary gearset to the input shaft.

Alternatively in this case, the first and second clutches may be disposed in a sequence of the second clutch and the first clutch, in a direction from the third planetary gearset to the input shaft.

As a third example, the input shaft is disposed opposite of the output gear with respect to the second planetary gearset, and both of the first and second clutches are disposed toward the input shaft with respect to the second planetary gearset. In this case, the first and second clutches may be disposed in a sequence of the first clutch and the second clutch, in a direction from the second planetary gearset to the input shaft.

A one way clutch disposed in parallel with the first brake may be further included in such an exemplary six-speed powertrain of an automatic transmission. The first and second brakes may be realized as wet-type multi-plate brakes or band brakes.

BRIEF DESCRIPTION OF THE DRAWINGS

The accompanying drawings illustrate exemplary embodiments of the present invention, and, together with the description, serve to explain the principles of the present invention, wherein:

FIG. 5 is an operational chart for a six-speed powertrain of an automatic transmission, according to embodiments of the present invention;

FIGS. 14A–14F are charts showing operational states obtained when a six-speed powertrain of an automatic transmission, according to embodiments of the present invention operate with specific gear ratios.

DETAILED DESCRIPTION OF THE EMBODIMENTS

Figure 1:
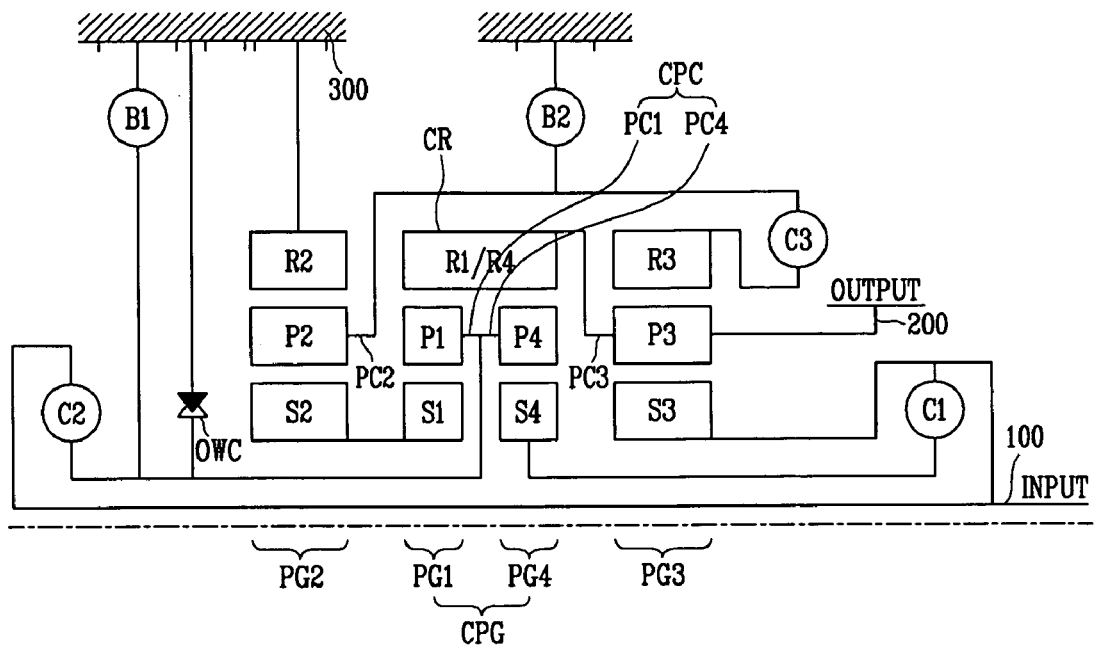
FIG. 1 illustrates a six-speed powertrain of an automatic transmission, according to a first embodiment of the present invention.

An embodiment of the present invention will hereinafter be described in detail with reference to the accompanying drawings.

As shown in FIG. 1 through FIG. 4, a six-speed powertrain of an automatic transmission according to embodiments of the present invention includes four planetary gearsets of first, second, third, and fourth planetary gearsets PG1, PG2, PG3, and PG3. The first planetary gearset PG1 is a single pinion planetary gearset, and includes a first sun gear S1, a first carrier PC1, and a first ring gear R1 as operational elements thereof. A first pinion gear P1, being engaged with both the first ring gear R1 and the first sun gear S1, is connected to and carried by the first carrier PC1.

The second planetary gearset PG2 is a single pinion planetary gearset, and includes a second sun gear S2, a second carrier PC2, and a second ring gear R2 as operational elements thereof. A second pinion gear P2, being engaged with both the second ring gear R2 and the second sun gear S2, is connected to and carried by the second carrier PC2.

The third planetary gearset PG3 is a single pinion planetary gearset, and includes a third sun gear S3, a third carrier PC3, and a third ring gear R3 as operational elements thereof. A third pinion gear P3, being engaged with both the third ring gear R3 and the third sun gear S3, is connected to and carried by the third carrier PC3.

The fourth planetary gearset PG4 is a single pinion planetary gearset, and includes a fourth sun gear S4, a fourth carrier PC4, and a fourth ring gear R4 as operational elements thereof. A fourth pinion gear P4, being engaged with both the fourth ring gear R4 and the fourth sun gear S4, is connected to and carried by the fourth carrier PC4.

In addition, as shown in FIG. 1 through FIG. 4, a six-speed powertrain of an automatic transmission according to embodiments of the present invention further includes an input shaft 100 for receiving torque from an engine (not shown), an output gear 200 for outputting torque from the powertrain, and a transmission case 300. The first ring gear R1 is fixedly connected to the third carrier PC3, and is also fixedly connected to the fourth ring gear R4. The first carrier PC1 is fixedly connected to the fourth carrier PC4. The first sun gear S1 is fixedly connected to the second sun gear S2. The second ring gear R2 is always stationary by being fixedly connected to the transmission case 300. The third sun gear S3 always acts as an input element by being fixedly connected to the input shaft 100. The third carrier PC3 always acts as an output element by being fixedly connected to the output gear 200. The fourth sun gear S4 is variably connected to the input shaft 100 via a first clutch C1.

At least one of the fixedly connected first and fourth carriers PC1 and PC4 is variably connected to the input shaft 100 via a second clutch C2. The second carrier PC2 is variably connected to the third ring gear R3 via a third clutch C3.

At least one of the fixedly connected first and fourth carriers PC1 and PC4 is variably connected to the transmission case 300 via a first brake B1 and is subject to a stopping operation of the first brake B1. The second carrier PC2 is variably connected to the transmission case 300 via a second brake B2 and is subject to a stopping operation of the second brake B2.

As shown in FIG. 1 through FIG. 4, the first, second, third, and fourth planetary gearsets PG1, PG2, PG3, and PG4 are disposed in a sequence of the second planetary gearset PG2, the first planetary gearset PG1, the fourth planetary gearset PG4, and the third planetary gearset PG3.

As shown in FIG. 1 through FIG. 4, regarding the first and fourth planetary gearsets PG1 and PG4 disposed adjacent to each other between the second and third planetary gearsets PG2 and PG3, the first ring gear R1 of the first planetary gearset PG1 is integrally formed with the fourth ring gear R4 of the fourth planetary gearset PG4. That is, one common ring gear CR commonly acts as a ring gear for the first and fourth planetary gearsets PG1 and PG4.

In addition, the first carrier PC1 of the first planetary gearset PG1 is integrally formed with the fourth carrier PC4 of the fourth planetary gearset PG4. That is, one common pinion carrier CPC commonly acts as a carrier for the first and fourth planetary gearsets PG1 and PG4. That is, first pinion gear P1 of the first planetary gearset PG1 and the fourth pinion gear P4 of the fourth planetary gearset PG4 are interconnected by one common pinion carrier CPC, and they are under the same operation. Therefore, the first planetary gearset PG1 and the fourth planetary gearset PG4 form a compound planetary gearset CPG.

Regarding such a compound planetary gearset CPG, in the description hereinafter, the first planetary gearset PG1 and the fourth planetary gearset PG4 are supposed to have the same ring gear/sun gear tooth ratio. However, such a supposition better describes the understanding of the spirit of the present invention, and it should not be understood that the scope of the present invention is limited thereto. The first planetary gearset PG1 may have a different ring gear/sun gear tooth ratio from the fourth planetary gearset PG4, and consequences of such a difference will be obvious to a person of ordinary skill in the art from the following description.

As shown in FIG. 1, according to a six-speed powertrain of a first embodiment of the present invention, the input shaft 100 is disposed in a same direction of the output gear 200 with respect to the third planetary gearset PG3.

In addition, one of the first and second clutches C1 and C2 is disposed toward the input shaft 100 with respect to the third planetary gearset PG3. Also, another one of the first and second clutches C1 and C2 is disposed opposite of the input shaft 100 with respect to the second planetary gearset PG2. In more detail, the first clutch C1 is disposed toward the input shaft 100 with respect to the third planetary gearset PG3, and the second clutch C2 is disposed opposite of the input shaft 100 with respect to the second planetary gearset PG2.

Figure 2:
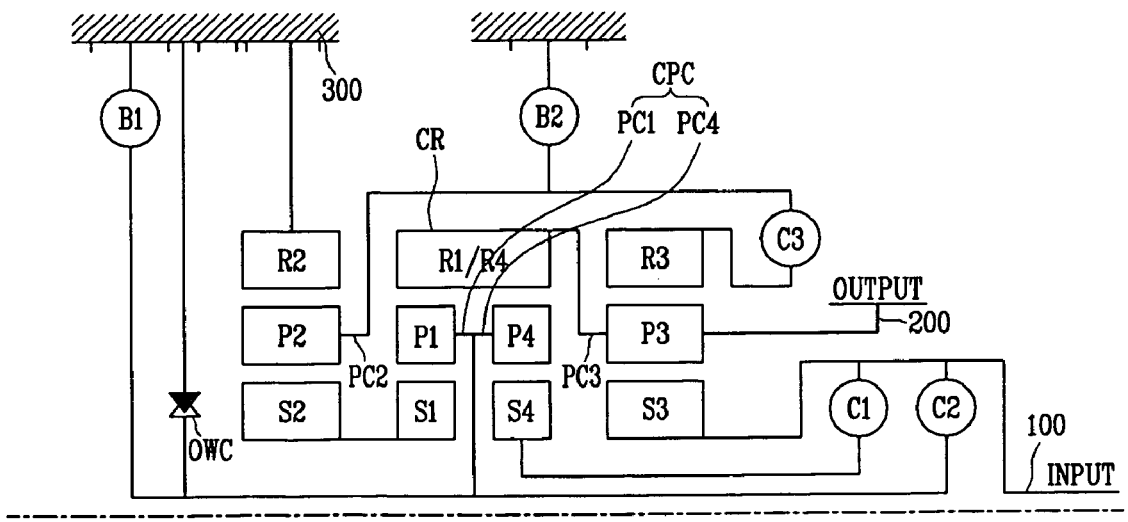
FIG. 2 illustrates a six-speed powertrain of an automatic transmission, according to a second embodiment of the present invention.
Figure 3:
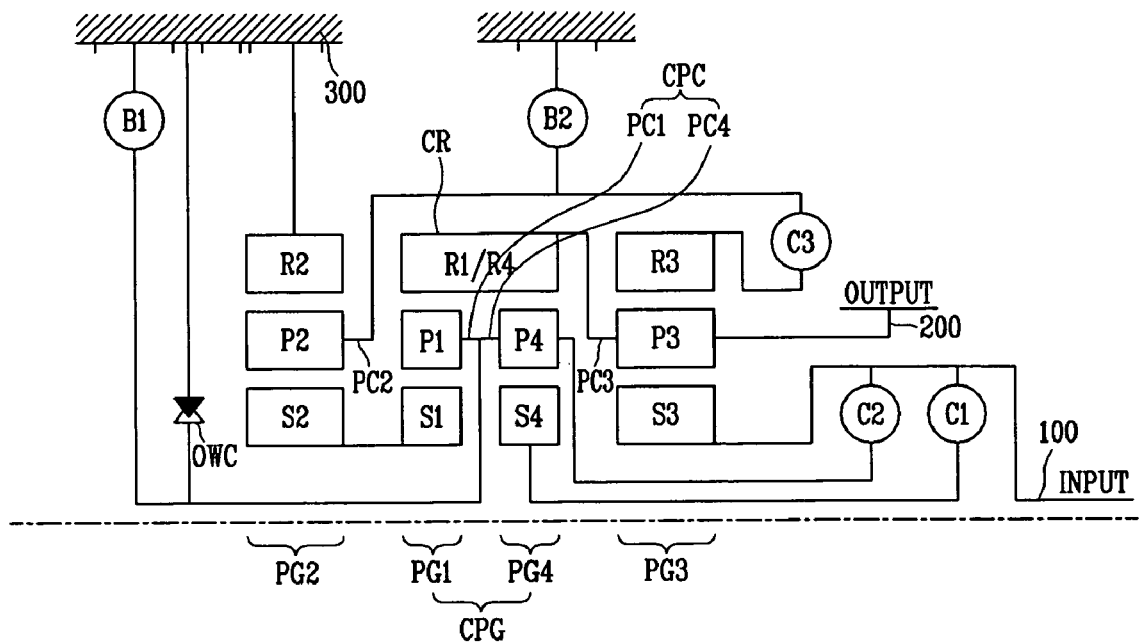
FIG. 3 illustrates a six-speed powertrain of an automatic transmission, according to a third embodiment of the present invention.

As shown in FIG. 2 and FIG. 3, according to a six-speed powertrain of a second or third embodiment of the present invention, the input shaft 100 is disposed in a same direction of the output gear 200 with respect to the third planetary gearset PG3, and both of the first and second clutches C1 and C2 are disposed toward the input shaft 100 with respect to the third planetary gearset PG3. As shown in FIG. 2, according to a six-speed powertrain of a second embodiment of the present invention, the first and second clutches C1 and C2 are disposed in a sequence of the first clutch C1 and the second clutch C2, in a direction from the third planetary gearset PG3 to the input shaft 100.

As shown in FIG. 3, according to a six-speed powertrain of a third embodiment of the present invention, the first and second clutches C1 and C2 are disposed in a sequence of the second clutch C2 and the first clutch C1, in a direction from the third planetary gearset PG3 to the input shaft 100.

Figure 4:
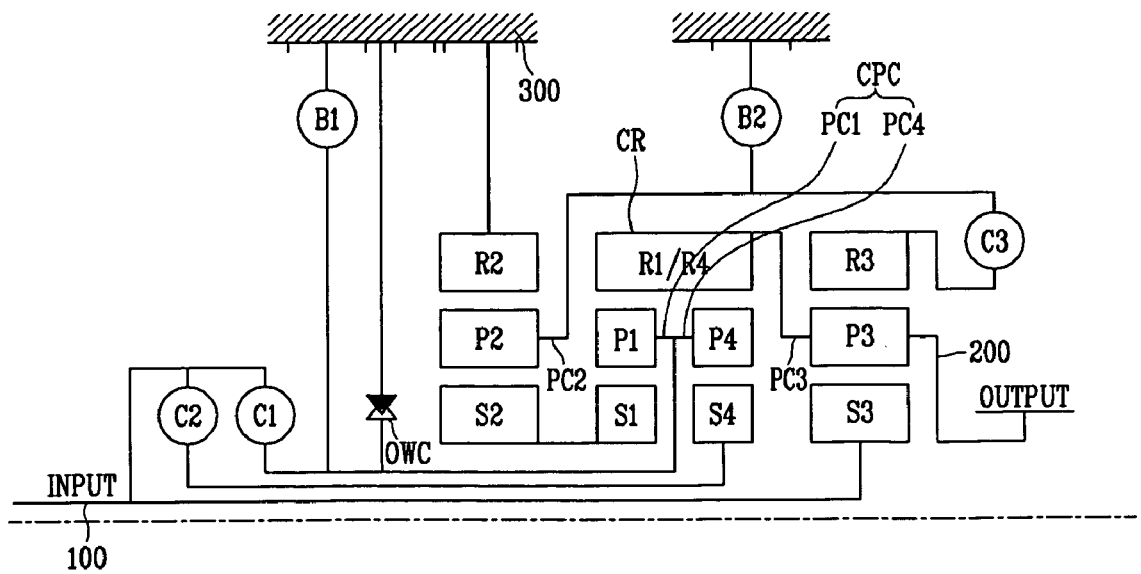
FIG. 4 illustrates a six-speed powertrain of an automatic transmission, according to a fourth embodiment of the present invention.

As shown in FIG. 4, according to a six-speed powertrain of a fourth embodiment of the present invention, the input shaft 100 is disposed opposite of the output gear 200 with respect to the second planetary gearset PG2, and both of the first and second clutches C1 and C2 are disposed toward the input shaft 100 with respect to the second planetary gearset PG2.

In more detail, according to a six-speed powertrain of a fourth embodiment of the present invention, the first and second clutches C1 and C2 are disposed in a sequence of the first clutch C1 and the second clutch C2, in a direction from the second planetary gearset PG2 to the input shaft 100.

As shown in FIG. 1 through FIG. 4, a six-speed powertrain of any of the first through fourth embodiment of the present invention further includes a one way clutch OWC disposed in parallel with the first brake B1. Due to such a one way clutch OWC, a first forward speed can be realized by operation of the third clutch C3 without operation of the first brake B1.

According to a six-speed powertrains of the first through fourth embodiments of the present invention, each of the first and second brakes B1 and B2 may by realized by a wet-type multi-plate brake or a band brake.

Hereinafter, an operation of a six-speed powertrain of an automatic transmission according to an embodiment of the present invention is described in detail. The following description may be equally applied to the first through fourth embodiments of the present invention.

As shown in FIG. 5, a six-speed powertrain of an automatic transmission according to an embodiment of the present invention operates: the third clutch C3 and the first brake B1 at a first forward speed D1; the third clutch C3 and the second brake B2 at a second forward speed D2; the third clutch C3 and the first clutch C1 at a third forward speed D3; the third clutch C3 and the second clutch C2 at a fourth forward speed D4; the first clutch C1 and the second clutch C2 at a fifth forward speed D5; and the second clutch C2 and the second brake B2 at a sixth forward speed D6. The first clutch C1 and the first brake B1 are operated at a reverse speed R.

Specific values of shift ratios shown in FIG. 5 are obtained in the case that first, second, third, and fourth planetary gearsets PG1, PG2, PG3, and PG4 have ring gear/sun gear tooth ratios as shown in FIG. 14A. When the ring gear/sun gear tooth ratios of the first, second, third, and fourth planetary gearsets PG1, PG2, PG3, and PG4 differ from FIG. 14A, values of shift ratios for the different ring gear/sun gear tooth ratios may be obviously calculated by a person of ordinary skill in the art from the detailed description of the present invention.

Figure 6:
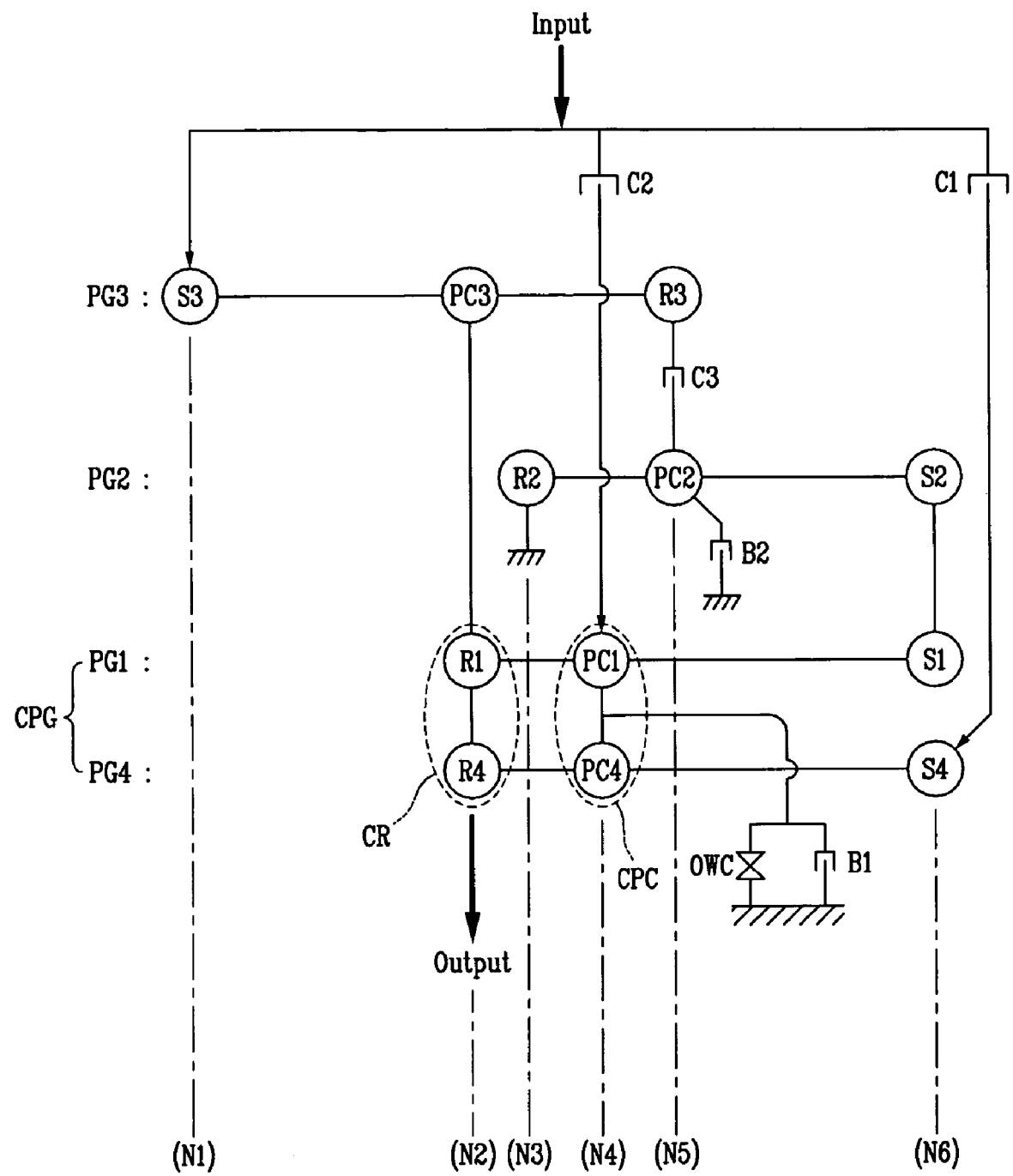
FIG. 6 is a lever diagram illustrating operational nodes (N1 through N6) of a six-speed powertrain of an automatic transmission, according to embodiments of the present invention, in the case that the first planetary gearset PG1 and the fourth planetary gearset PG4 have equal ring gear/sun gear tooth ratios.

FIG. 6 is a lever diagram illustrating operational nodes (N1 through N6) of a six-speed powertrain of an automatic transmission according to embodiments of the present invention, in the case that the first planetary gearset PG1 and the fourth planetary gearset PG4 have equal ring gear/sun gear tooth ratios.

Therefore, operational elements of the fourth planetary gearset PG4 show rotational characteristics equal to operational elements of the first planetary gearset PG1. Therefore, they may be represented by operational elements of the first planetary gearset PG1 and be disregarded hereinafter.

As shown in FIG. 6, the first ring gear R1, the first carrier PC1, and the first sun gear S1 of the first planetary gearset PG1 are sequentially located at operational nodes N2, N4, and N6 in the lever diagram.

The second ring gear R2, the second carrier PC2, and the second sun gear S2 of the second planetary gearset PG2 are sequentially located at operational nodes N3, N5, and N6 in the lever diagram. The third sun gear S3, the third carrier PC3, and the third ring gear R3 of the third planetary gearset PG3 are sequentially located at operational nodes N1, N2, and N5 in the lever diagram. The fourth ring gear R4, the fourth carrier PC4, and the fourth sun gear S4 of the fourth planetary gearset PG4 are sequentially located at operational nodes N2, N4, and N6 in the lever diagram.

As described above, the input shaft 100 is variably connected to the fourth sun gear S4 and the first carrier PC1 (or equivalently, the fourth carrier PC4) via the first and second clutches C1 and C2, respectively. Therefore, engine rotation input through the input shaft 100 is delivered to the sixth node N6 or the fourth node N4 according to an operation of the first and second clutches C1 and C2, respectively.

The first carrier PC1 (or equivalently, the fourth carrier PC4) is variably connected to the transmission case 300 via the first brake B1 and the one way clutch OWC disposed in parallel. Therefore, the fourth node N4 of the first carrier PC1 and the fourth carrier PC4 may be stopped by an operation of the first brake B1 and/or the one way clutch OWC.

In addition, the second carrier PC2 is variably connected to the transmission case 300 via the second brake B2. Therefore, the fifth node N5 may be stopped by an operation of the second brake B2.

Hereinafter, formation of each speed by a six-speed powertrain of an automatic transmission according to an embodiment of the present invention is described in detail with reference to FIGS. 7–13.

In FIG. 7 through FIG. 13, L1 denotes a speed line for the first planetary gearset PG1, L2 denotes a speed line for the second planetary gearset PG2, and L3 denotes a speed line for the third planetary gearset PG3. The speed line L1 of the first planetary gearset PG1 and the speed line L2 of the second planetary gearset PG2 meet at the sixth node N6, since the first sun gear S1 and the second sun gear S2 are fixedly interconnected. The speed line L1 of the first planetary gearset PG1 and the speed line L3 of the third planetary gearset PG3 meet at the second node N2 since the first ring gear R1 and the third carrier PC3 are fixedly interconnected.

The third node N3 is always stationary since the second ring gear R2 is fixedly connected to the transmission case 300. The third sun gear S3 always rotates at an input speed since it is fixedly connected to the input shaft. Arrangement of the speed lines L1, L2, and L3 of the first, second, and third planetary gearsets PG1, PG2, and PG3 are determined by selective operation of the first, second, and third clutches C1, C2, and C3 and the first and second brakes B1 and B2 under such a condition.

Figure 7:
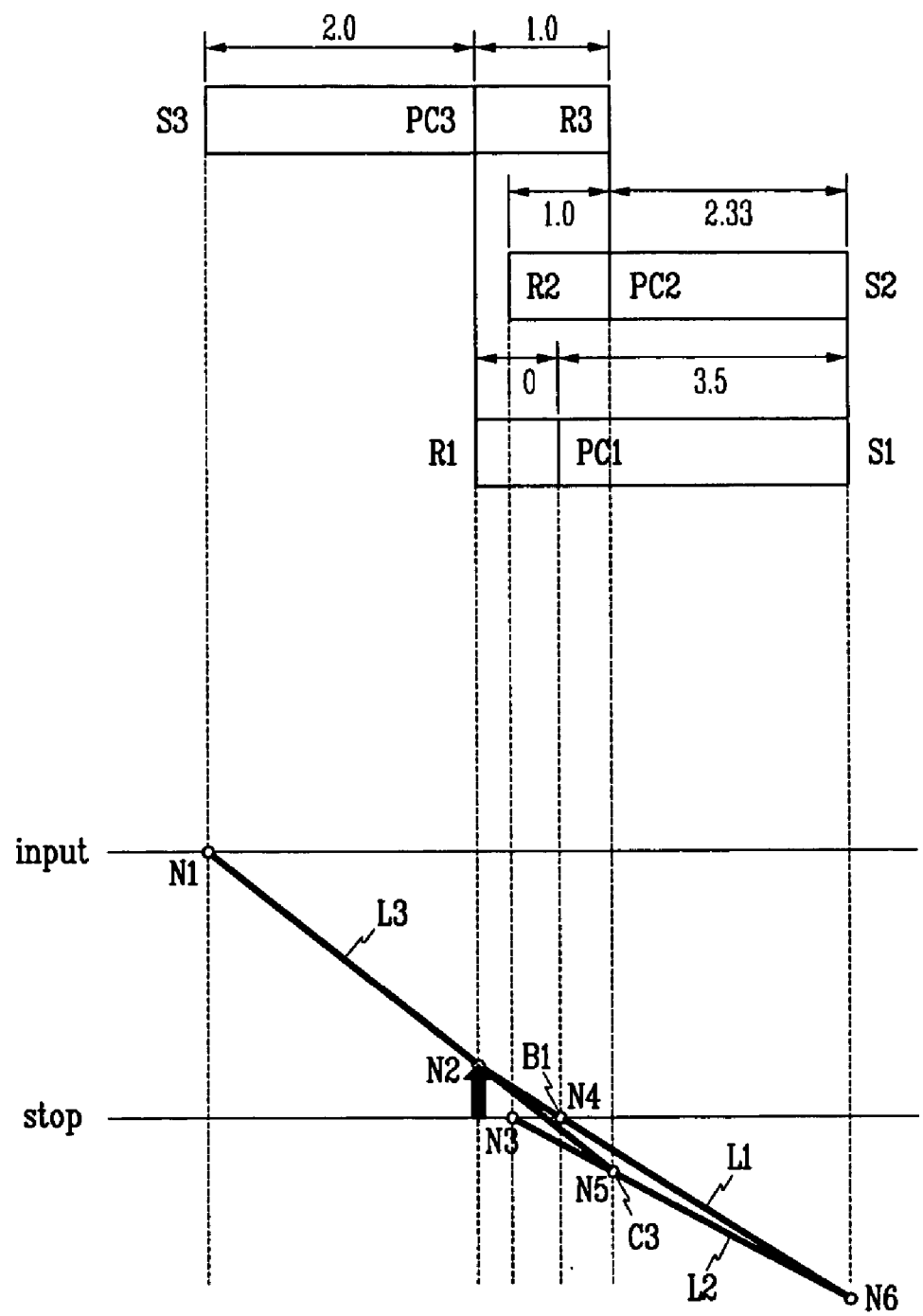
FIG. 7 illustrates a speed diagram for a first forward speed of a six-speed powertrain of an automatic transmission, according to embodiments of the present invention.

At the first forward speed D1, as shown in FIG. 7, the third ring gear R3 and the second carrier PC2 on the fifth node N5 rotate at a synchronized speed since the third clutch C3 operates. In addition, the fourth node N4 is stationary since the first brake B1 operates.

Therefore in this case, the speed lines L1, L2, and L3 are formed as shown in FIG. 7. That is, regarding the third, fifth, and sixth nodes N3, N5, and N6 of the second planetary gearset PG2, the third node N3 is stationary, and the fifth and sixth nodes N5 and N6 rotate at a negative speed, i.e., in reverse.

Regarding the second, fourth, and sixth nodes N2, N4, and N6 of the first planetary gearset PG1, the speed line L1 is a line connecting the sixth node N6 that is rotating in reverse and the fourth node N4 that is stationary. Therefore, the speed line L3 of the third planetary gearset PG3 is formed to be declining rightward as shown in FIG. 7. In this case, an output element of the third carrier PC3 rotates at a very low speed relative to a rotation of the input shaft 100.

Figure 8:
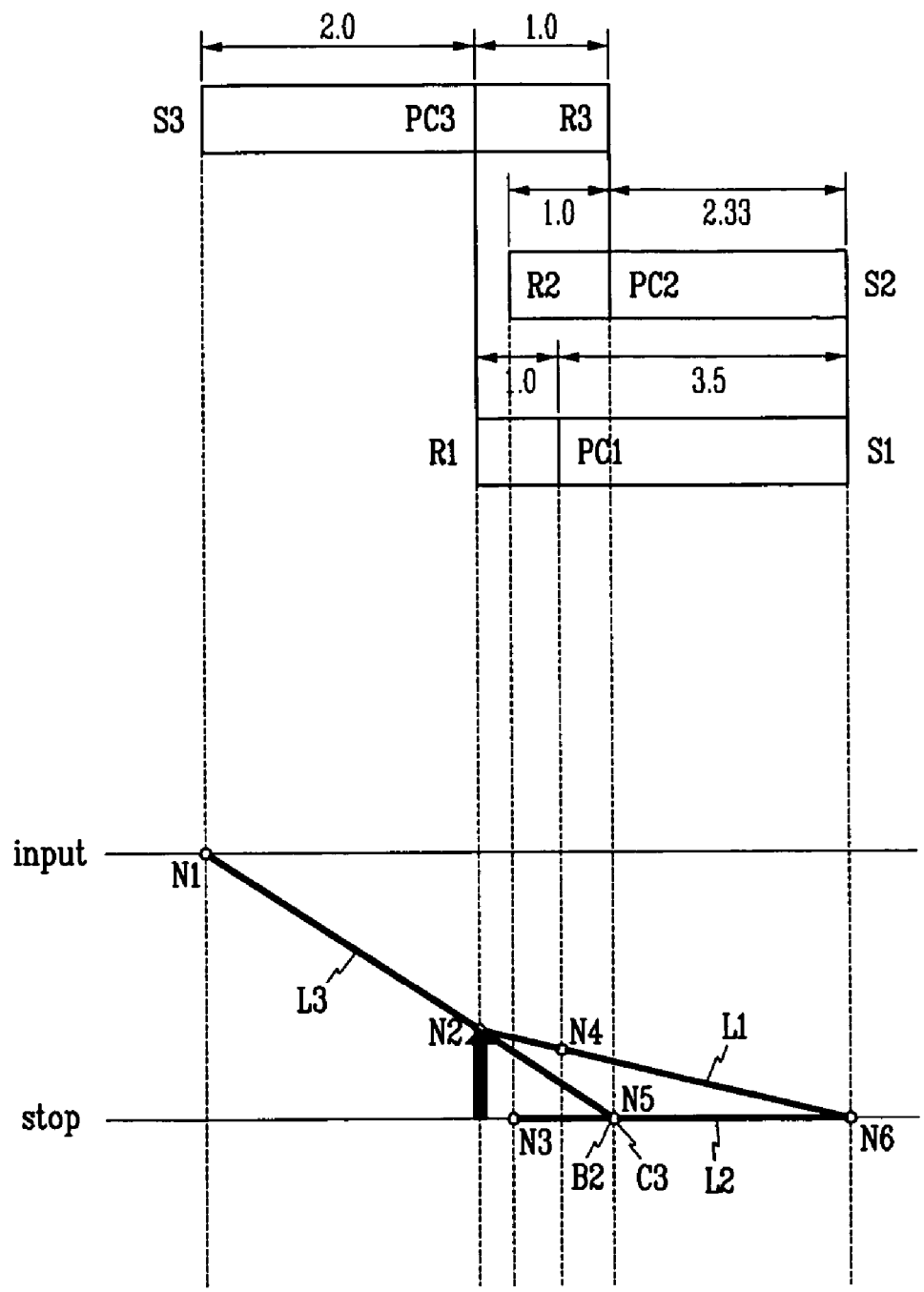
FIG. 8 illustrates a speed diagram for a second forward speed of a six-speed powertrain of an automatic transmission, according to embodiments of the present invention.

At such a first forward speed, all the first, second, and third planetary gearsets PG1, PG2, and PG3 take part in the power transmission. At the second forward speed D2, as shown in FIG. 8, the third ring gear R3 and the second carrier PC2 on the fifth node N5 remain rotating at a synchronized speed since the third clutch C3 also operates in the second forward speed. In addition, the fifth node N5 is stationary since the second brake B2 operates. Therefore, the speed line L3 of the third planetary gearset PG3 is formed by the fifth node N5 that is stationary and the first node N1 rotating at the input speed. Such a speed line L3 of the third planetary gearset PG3 becomes slightly rotated counterclockwise, in comparison with the first forward speed. Therefore, the third carrier PC3 that is an output element rotates at an increased speed in comparison with the first forward speed.

Figure 9:
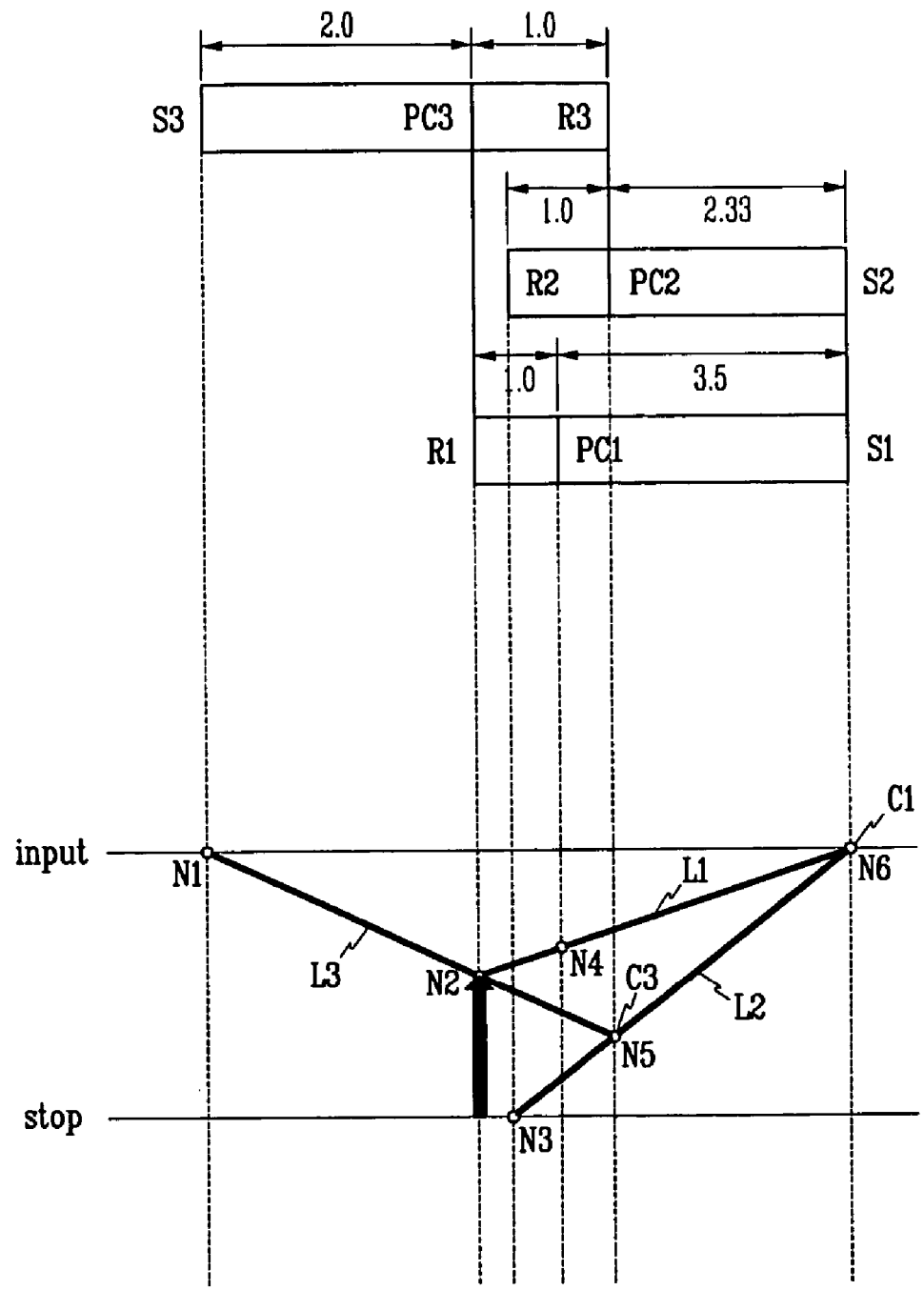
FIG. 9 illustrates a speed diagram for a third forward speed of a six-speed powertrain of an automatic transmission, according to embodiments of the present invention.

At such a second forward speed, only the third planetary gearset PG3 takes part in the power transmission since the second planetary gearset PG2 is stationary. At the third forward speed D3, as shown in FIG. 9, the third ring gear R3 and the second carrier PC2 on the fifth node N5 remain rotating at a synchronized speed since the third clutch C3 also operates in the third forward speed.

In addition, the sixth node N6 also rotates at the same speed as the input shaft 100 since the first clutch C1 operates. Therefore in this case, the speed line L2 of the second planetary gearset PG2 is formed by the third node N3 that is stationary and the sixth node N6 rotating at the input speed.

The drive line L3 of the third planetary gearset PG3 is determined by the fifth node N5 on the speed line L2 of the second planetary gearset PG2. Therefore, the speed line L3 of the third planetary gearset PG3 becomes slightly rotated counterclockwise, in comparison with the second forward speed. Therefore, the third carrier PC3 that is an output element rotates at an increased speed in comparison with the second forward speed. At such a third forward speed, the second and third planetary gearsets PG2 and PG3 take part in the power transmission.

Figure 10:
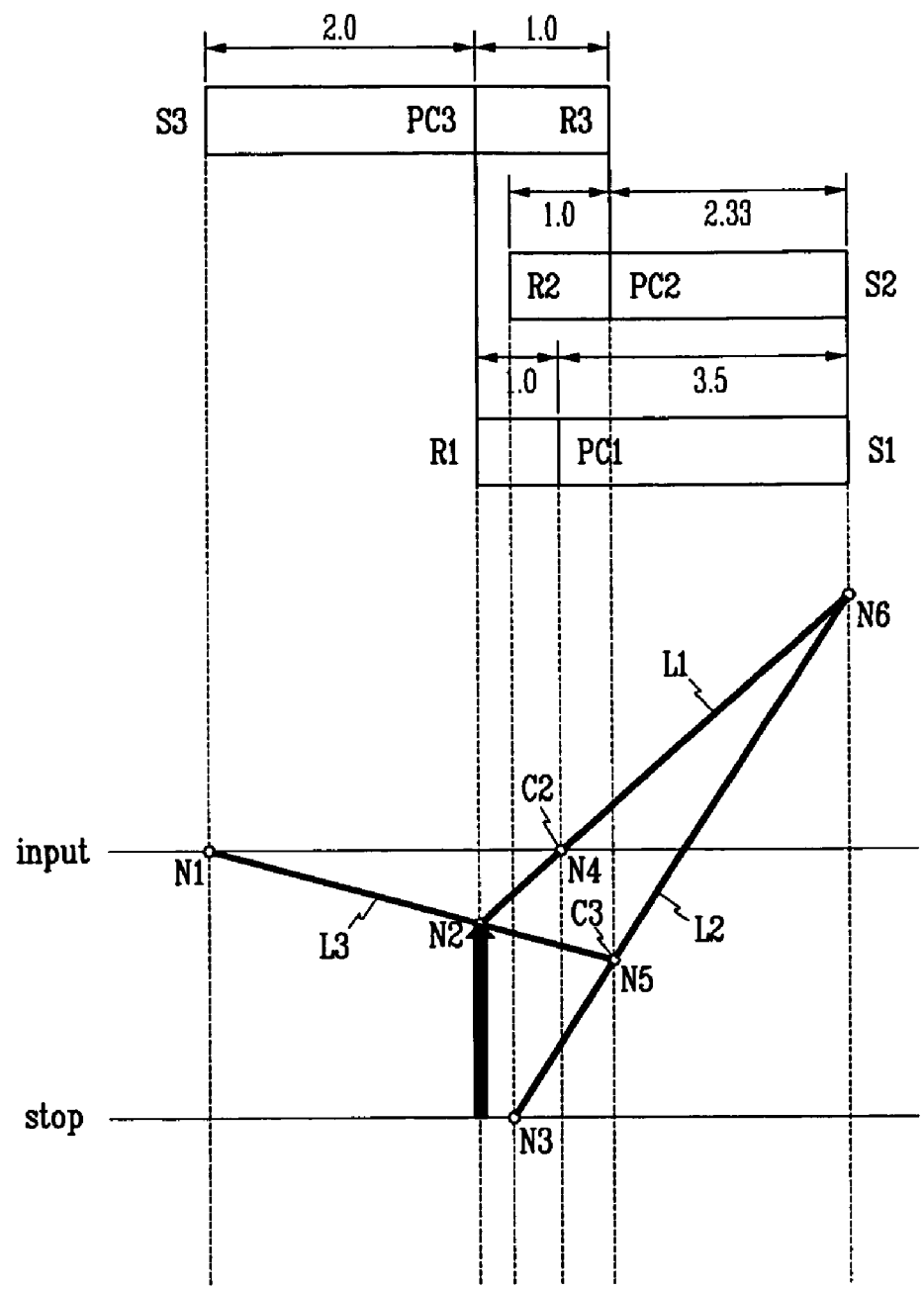
FIG. 10 illustrates a speed diagram for a fourth forward speed of a six-speed powertrain of an automatic transmission, according to embodiments of the present invention.

At the fourth forward speed D4, as shown in FIG. 10, the third ring gear R3 and the second carrier PC2 on the fifth node N5 remain rotating at a synchronized speed since the third clutch C3 also operates in the fourth forward speed. In addition, the fourth node N4 also rotates at the same speed as the input shaft 100 since the second clutch C2 operates. Therefore in this case, the speed lines L1, L2, and L3 are formed as shown in FIG. 10. That is, the speed line L2 of the second planetary gearset PG2 becomes slightly rotated counterclockwise, in comparison with the third forward speed.

In the same way, the speed line L3 of the third planetary gearset PG3 becomes slightly rotated counterclockwise, in comparison with the third forward speed. Therefore, the third carrier PC3 that is an output element rotates at an increased speed in comparison with the third forward speed. At such a fourth forward speed, all the first, second, and third planetary gearsets PG1, PG2, and PG3 take part in the power transmission.

Figure 11:
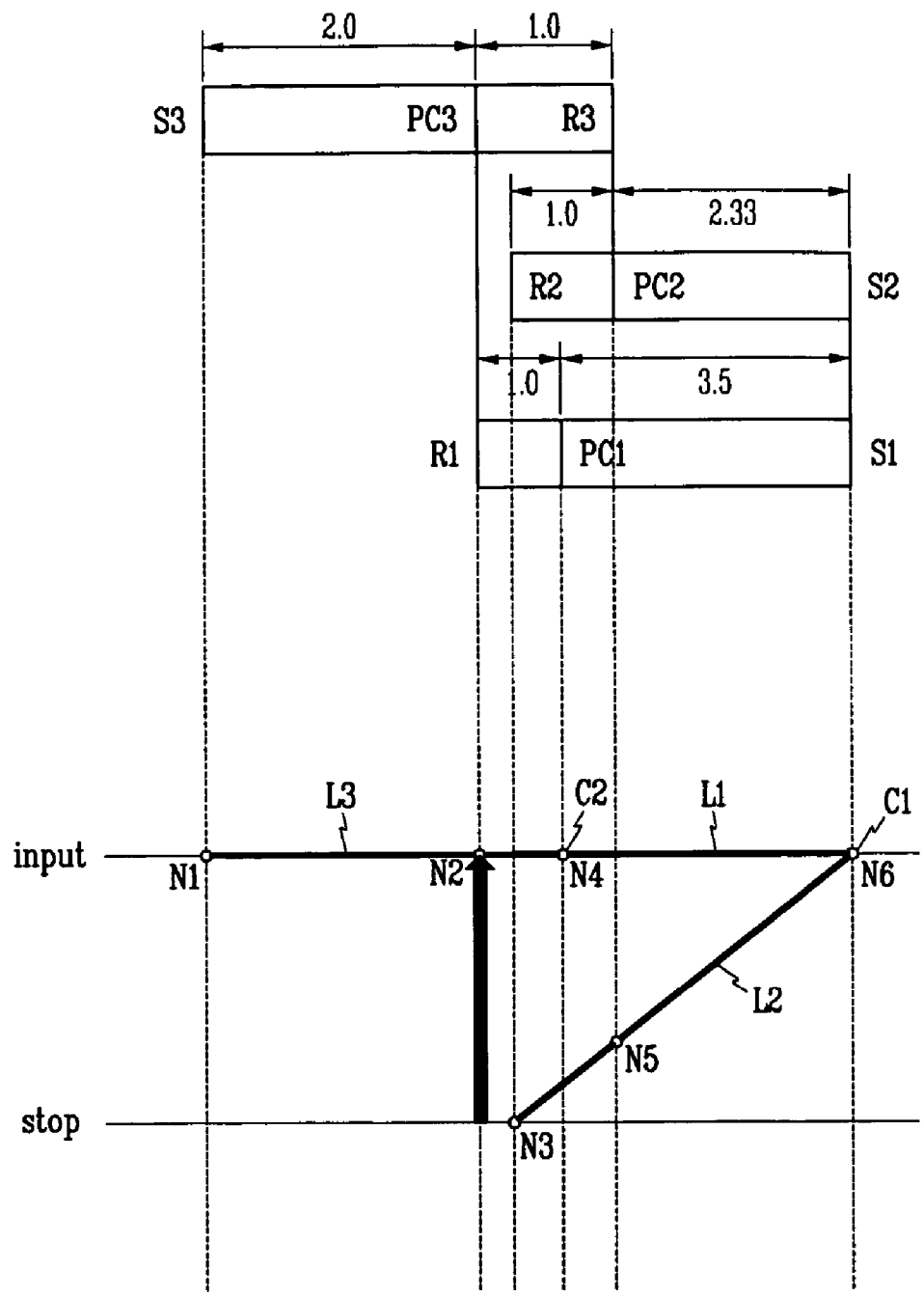
FIG. 11 illustrates a speed diagram for a fifth forward speed of a six-speed powertrain of an automatic transmission, according to embodiments of the present invention.

At the fifth forward speed D5, the first and second clutches C1 and C2 operate. Therefore, as shown in FIG. 11, the fourth and sixth nodes N4 and N6 rotate at the same speed as the input shaft 100. Therefore, the speed line L1 of the first planetary gearset PG1 becomes horizontal at a height of rotation speed of the input shaft 100. This implies that the first planetary gearset rotates as a whole. Therefore, the second node N2 also rotates at the input speed, and accordingly, the input speed is directly output without changing. At such a fifth forward speed, none of the first, second, and third planetary gearsets PG1, PG2, and PG3 takes part in the power transmission.

Figure 12:
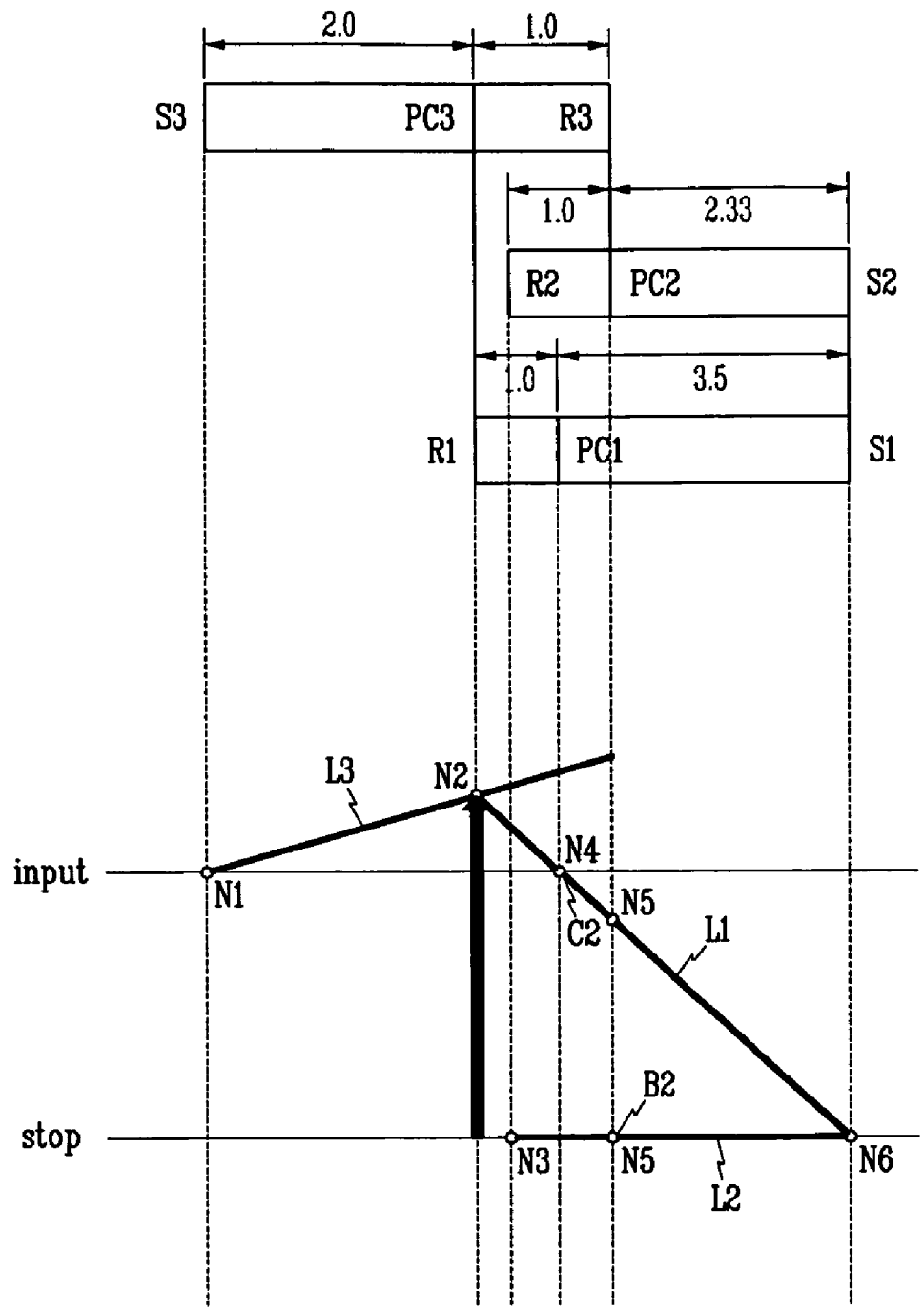
FIG. 12 illustrates a speed diagram for a sixth forward speed of a six-speed powertrain of an automatic transmission, according to embodiments of the present invention.

At the sixth forward speed D6, as shown in FIG. 12, the fourth node N4 rotates at the same speed as the input shaft 100 since the second clutch C2 operates. In addition, the second carrier PC2 of the fifth node N5 becomes stationary since the second brake B2 operates.

Accordingly, the second planetary gearset PG2 becomes stationary as a whole since both the second ring gear R2 and the second carrier PC2 are stationary. Therefore, the first sun gear S1 of the sixth node N6 becomes stationary.

The speed line L1 of the first planetary gearset PG1 is formed by the sixth node N6 that is stationary and the fourth node N4 rotating at the input speed. Therefore, the second node N2 on the speed line L1 of the first planetary gearset PG1 rotates at a speed higher than the input speed. This implies that rotation speed output from the third carrier PC3 is higher than the input speed. At such a sixth forward speed, only the first planetary gearset PG1 takes part in the power transmission.

Figure 13:
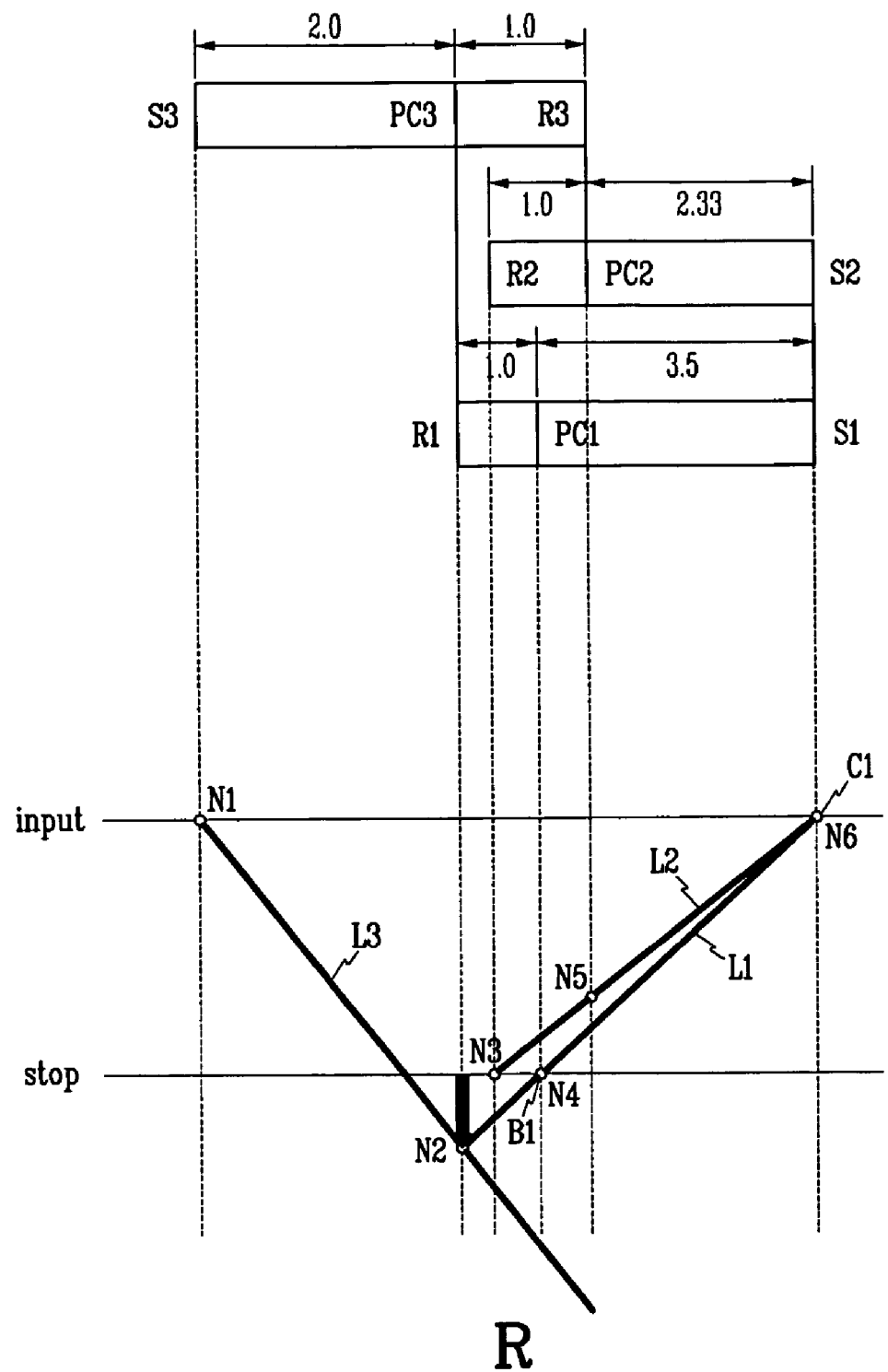
FIG. 13 illustrates a speed diagram for a reverse speed of a six-speed powertrain of an automatic transmission, according to embodiments of the present invention.

At the reverse speed R, the first clutch C1 and the first brake B1 operate. Therefore, as shown in FIG. 13, the speed line L1 of the first planetary gearset PG1 is formed by the fourth node N4 that is stationary and the sixth node N6 rotating at the input speed. Therefore, the second node N2 on the speed line L1 of the first planetary gearset PG1 rotates at a negative speed, i.e., rotates reversely, as shown in FIG. 13. At such a sixth forward speed, only the first planetary gearset PG1 takes part in the power transmission.

FIGS. 14A–14F are charts showing operation states of a power train of an automatic transmission according to a preferred embodiment of the present invention.

In particular, FIG. 14A shows detailed specifications of the powertrain according to one embodiment, i.e., gear ratios of each planetary gearset. FIG. 14B shows speed ratios in each shift-speed of the powertrain of such an embodiment obtained by the detailed specification of FIG. 14A. FIG. 14C shows rotation speeds of each operational element relative to that of the input element, for each shift-speed. FIG. 14D shows slip speeds of friction elements at each shift-speed. FIG. 14E shows torque loads that each operational element or each friction element undertakes. FIG. 14F shows planetary gearsets that take part in power transmission in each shift-speed.

Details shown in FIG. 14F are apparent from the above description of shifting operation of the powertrain of the present invention, and the numbers shown in FIGS. 14C–14E may be calculated by a person skilled in the art based on the structural features and operational chart of the powertrain of the present embodiment.

As is well known in the art, under hard acceleration, a high load is input to an automatic transmission. According to powertrains of some embodiments, no operational element rotates faster than the input speed at the second and third speeds that are frequently engaged for acceleration (refer to FIG. 14C), and therefore, slip speeds of friction elements not operated at the third speed are less than the rotation speed of the input shaft (refer to FIG. 14D).

When the performance shown in FIG. 14D is compared with performance of a prior art powertrain shown in FIG. 17D, it is apparent that the powertrains of the present embodiments show less slip speeds of friction elements overall at the second to sixth speeds (especially at sixth forward speed) than conventional powertrains.

Also, it is well known that more planetary gearsets implies more loss of power during power transmission. When the performance shown in FIG. 14F is compared with performance of conventional powertrains, it is apparent that the powertrains of the preferred embodiments have less planetary gearsets involved in the power transmission at many of the shift-speeds, and accordingly they show better power efficiency.

According to a preferred embodiment of the present invention, six forward speeds and one reverse speed are achieved with a minimum number of friction elements such that an automatic transmission becomes lighter and more compact. Durability is increased due to reduction of rotation speeds of operational elements at a shift-speed frequently engaged for acceleration. A further increase of durability and reduction of power loss is also achieved by reduction of slip speeds of friction elements. A shortened route of power transmission also contributes to an increase in durability and reduction of power loss. In addition, torque load is dispersed to all operating elements of a planetary gearset, and accordingly the powertrain may endure higher load.

While this invention has been described in connection with what is presently considered to be the most practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A six-speed powertrain of an automatic transmission, comprising:

a first planetary gearset having operational elements of a first sun gear, a first ring gear, and a first carrier;

a second planetary gearset having operational elements of a second sun gear, a second ring gear, and a second carrier;

a third planetary gearset having operational elements of a third sun gear, a third ring gear, and a third carrier;

a fourth planetary gearset having operational elements of a fourth sun gear, a fourth ring gear, and a fourth carrier;

an input shaft;

an output gear; and a transmission case, wherein:

the first ring gear is fixedly connected to the third carrier and the fourth ring gear;

the first carrier is fixedly connected to the fourth carrier;

the first sun gear is fixedly connected to the second sun gear;

the second ring gear is always stationary by being fixedly connected to the transmission case;

the third sun gear always acts as an input element by being fixedly connected to the input shaft;

the third carrier always acts as an output element by being fixedly connected to the output gear;

the fourth sun gear is variably connected to the input shaft via a first clutch;

at least one of the fixedly connected first and fourth carriers is variably connected to the input shaft via a second clutch;

the second carrier is variably connected to the third ring gear via a third clutch;

at least one of the fixedly connected first and fourth carriers is variably connected to the transmission case via a first brake and is subject to a stopping operation of the first brake; and the second carrier is variably connected to the transmission case via a second brake and is subject to a stopping operation of the second brake.

2. The powertrain of claim 1, wherein the first, second, third, and fourth planetary gearsets are disposed in a sequence of the second planetary gearset, the first planetary gearset, the fourth planetary gearset, and the third planetary gearset.

3. The powertrain of claim 2, wherein:

the first ring gear of the first planetary gearset is integrally formed with the fourth ring gear of the fourth planetary gearset; and the first carrier of the first planetary gearset is integrally formed with the fourth carrier of the fourth planetary gearset, such that the first and fourth planetary gearsets form a compound planetary gearset.

4. The powertrain of claim 3, wherein the input shaft is disposed in a same direction of the output gear with respect to the third planetary gearset;

one of the first and second clutches is disposed toward the input shaft with respect to the third planetary gearset; and another one of the first and second clutches is disposed opposite of the input shaft with respect to the second planetary gearset.

5. The powertrain of claim 4, wherein:
the first clutch is disposed toward the input shaft with respect to the third planetary gearset; and
the second clutch is disposed opposite of the input shaft with respect to the second planetary gearset.

6. The powertrain of claim 3, wherein:
the input shaft is disposed in a same direction of the output gear with respect to the third planetary gearset; and
both of the first and second clutches are disposed toward the input shaft with respect to the third planetary gearset.

7. The powertrain of claim 6, wherein the first and second clutches are disposed in a sequence of the first clutch and the second clutch, in a direction from the third planetary gearset to the input shaft.

8. The powertrain of claim 6, wherein the first and second clutches are disposed in a sequence of the second clutch and the first clutch, in a direction from the third planetary gearset to the input shaft.

9. The powertrain of claim 3, wherein:
the input shaft is disposed opposite of the output gear with respect to the second planetary gearset; and
both of the first and second clutches are disposed toward the input shaft with respect to the second planetary gearset.

10. The powertrain of claim 9, wherein the first and second clutches are disposed in a sequence of the first clutch and the second clutch, in a direction from the second planetary gearset to the input shaft.

11. The powertrain of claim 1, further comprising a one way clutch disposed in parallel with the first brake.

12. The powertrain of claim 1, wherein the first and second brakes are wet-type multi-plate brakes or band brakes.

* * * * *